Aug. 16, 1966  R. J. HUNDHAUSEN  3,266,152
THEODOLITE
Filed March 4, 1963  2 Sheets-Sheet 1
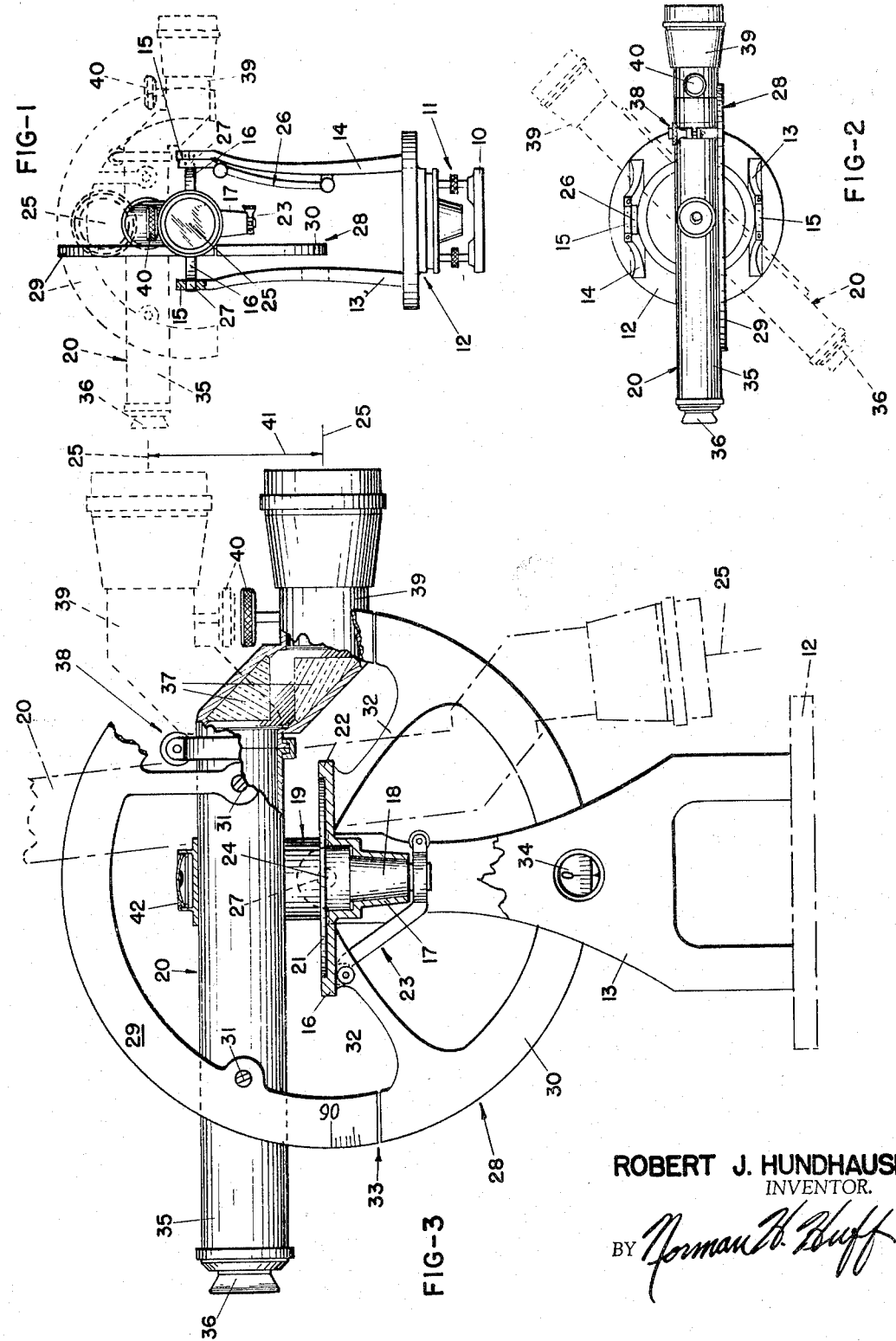
ROBERT J. HUNDHAUSEN
INVENTOR.
BY Norman H. Buff Aug. 16, 1966  R. J. HUNDHAUSEN  3,266,152
THEODOLITE
Filed March 4, 1963  2 Sheets-Sheet 2
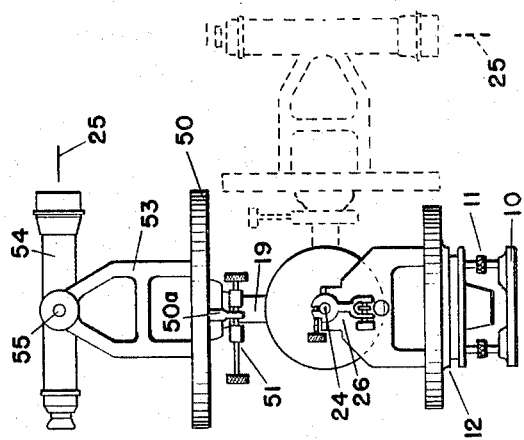
FIG-5
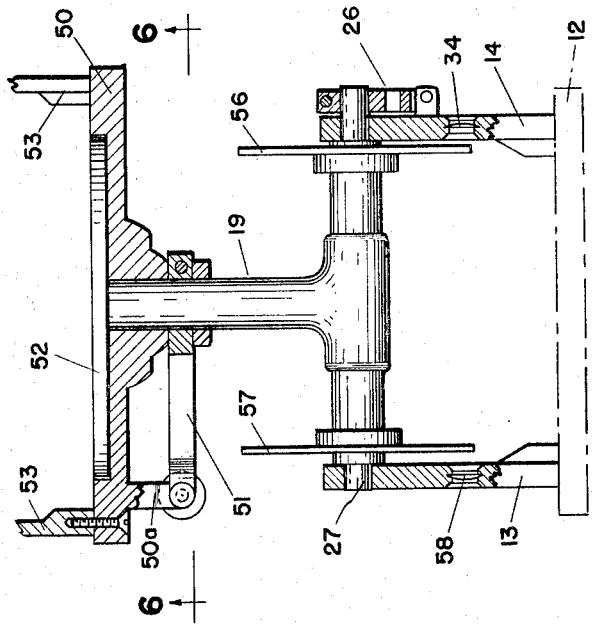
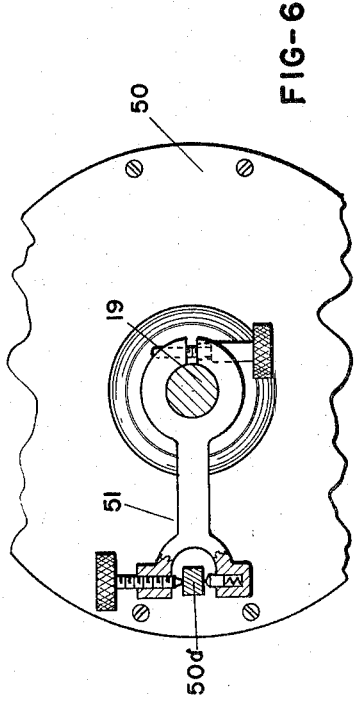
FIG-4
FIG-6
ROBERT J. HUNDHAUSEN
INVENTOR.
BY Norman H. Buff

United States Patent Office 3,266,152
Patented August 16, 1966

3,266,152
THEODOLITE
Robert J. Hundhausen, Rte. 2, Box 32,
Hayden Lake, Idaho
Filed Mar. 4, 1963, Ser. No. 262,754
3 Claims. (Cl. 33—69)

The present invention relates to instruments of the type used for surveying and astronomical measurements of horizontal and vertical angles which includes a relatively small telescope or optical member adapted to turn on both a horizontal and a vertical axis and more particularly to an improved optical member mounting means for a theodolite.

Conventional transits are provided with a tripodal stand which, through various leveling mechanisms, supports a base mounted for turning about a vertical axis. Standards are mounted upon the base and rotate therewith and in turn support a telescope or optical member for turning about a horizontal axis. Conventionally, this horizontal axis is normal to the optical axis of the optical member. Various circles marked with selected graduations and movement controlling clamps and tangent screws are provided along with a compass and levels all of which are common and well known to those skilled in the art to which this invention appertains.

In practice, a transit is set up by observing three preliminary conditions, i.e. the tripod feet should be firmly planted, the base should be level and the plumb-bob should be directly over the given point or station.

Many functions are performed by using transits, such as prolonging a straight line, measuring horizontal angles, laying out curves, leveling, establishing a profile and etc. The principle use for a profile is to enable an engineer to establish a grade line, that is, a line showing the slope of the road on which the amounts of excavation and embankment depend. In doing so, it is necessary to move and reset the instrument as many times as necessary within the line of sight of the instrument. Its limitations being that of the convenient length of the rod being used.

Embodied in the present invention the foregoing functions are simplified by providing means in addition to the conventional axes of rotation for rotating the optical axis of the optical member about an axis which is at all times normal to the optical axis.

It is therefore an object of the present invention to provide an improved theodolite in which the optical member is supported for rotation in addition to the conventional vertical and horizontal axes about a third axis fixed normal to the optical axis thus enabling one to move the optical member in a plane common to the optical axis about a normal turning axis at all positions of said optical member.

In the accompanying drawing, a preferred embodiment of the present invention is disclosed along with a modified species thereof and while I particularly disclose this invention with respect to a surveyor's transit, it is to be understood that it is not my intention to be so limited in scope but I desire to secure the invention broadly as set forth in the appended claims.

In the accompanying drawings like numerals are employed to designate like parts, and FIGURE 1 is a front elevational view of my improved theodolite showing parts in alternate position by broken lines;

FIGURE 2 is a plan view of the improved theodolite;

FIGURE 3 is an enlarged side elevation having portions broken away for convenience of illustration and showing alternate positions of parts by broken lines;

FIGURE 4 is a fragmentary front elevation of a modified theodolite having parts broken away for convenience of illustration;

FIGURE 5 is a side elevation upon a reduced scale of the modified species; and

FIGURE 6 is a fragmentary horizontal section taken substantially on line 6—6 of FIGURE 4 and looking in the direction of the arrows.

Referring now more particularly to the drawings, the numeral 10 represents a tripod supported plate of a conventional transit. Levelling screws 11 are employed to support a base 12 rotatable about a vertical axis which conventionally has one or more spirit levels and a compass thereon (not shown). Secured to the base 12 are standards 13 and 14 which at their upper ends are provided with conventional cap bearings at 15, which bearings journal a frame 16 for turning movements about a horizontal axis 24 of axle 27. The frame includes a bearing well 17 which rotatably contains a spindle 18 of a support 19 for an optical member 20. A graduated horizontal circle 21 is carried by the support 19 and vernier graduations may be supplied to the rim 22 of the frame 16. A conventional clamp and tangent screw 23 is provided for controlling turning movements of the optical member 20 about the axis of the spindle 18 which axis is fixed normal to the optical axis or line of sight indicated by the line 25 of FIGURE 3.

A clamp and tangent screw 26 is applied to the axle 27 and a standard 14 for conventional use.

A segmented vertical circle 28 is provided with an upper segment 29 and a lower segment 30 secured respectively to the optical member 20 as by screws 31 and to the frame 16 by means of integral arms 32. The segments 29 and 30 collectively form a complete circle 28 which is separated at 33 so that the optical member 20 may be rotated about the axis of spindle 18 as shown by the broken line position of FIGURES 1 and 2. Vernier graduations are provided on the circle 28 and are read through the magnifying lens 34 mounted in the standard 13 to indicate the degree of inclination of the optical member 20 with respect to horizontal.

In the species shown in FIGURES 1–3 the axes 18, 24, and 25 are each normal to each other and therefore intersect at a common point.

With the physical structure disclosed, it is desirable to provide means for the barrel 35, which is in axial alignment with the eye-piece 36, to be axially offset with respect to the optical axis 25 so that no physical structures must be disposed within the line of sight within the optical member. To accomplish this, I provide a pair of prisms 37 disposed in a well known manner to project the image from the optical axis 25 laterally to the eye-piece centric of the barrel 35.

To enable an engineer to sight more nearly vertical, I have provided a manually releasable pivotal connection 38 for rotation about the axis of the barrel 35 so that the offset object glass housing 39 may be rotated 180° from that shown in the full line position of FIGURE 3 to that shown by broken lines thereof. Thus, when the optical member 20 is tilted about the horizontal axis 24 to the dot and dash position of FIGURE 3, the optical axis may be disposed as far removed from the axis of rotation of the base 12 as permitted by the physical dimension of the offset between the axis of the barrel 35 and the optical axis 25. Obviously, this offset may vary as desired during manufacture of the optical member. When the housing 39 is rotated 180° from the full line position of FIGURE 3 to the broken line position, it is then only necessary to modify the calculations by the distance the optical axis is removed from its normal position, which distance is indicated by the double ended arrow numbered 41.

A spirit level 42 is provided on the top of the optical member 20.

The adjusting knob 40 is provided for focusing the object glass contained within the housing 39.

In the modified species, the standards 13 and 14 support the axle 27 rotatable about the horizontal axis 24 and to which axle is secured a perpendicular supporting post 19. Instead of the supporting post 19 being journaled in a frame as at 16 of FIGURES 1–3, I have provided a revoluble frame 50 journaled on the supporting post 19, which frame is adapted to be releasably and adjustably secured with respect thereto by means of the conventional clamp and tangent screw 51 which impinges on post 50a.

Horizontal circle 52 may be secured to the post 19 and the frame 50 rotate thereabout, then the graduations and vernier markings may be applied selectively to either the circle 52 or the frame 50 as desired.

Means such as arms 53 are carried by the frame 50 and support a telescope 54. In the present construction, for most uses, the telescope 54 may be fixed to the arms 53 in the position shown in FIGURE 5. For other uses, the telescope 54 may be pivoted at 55. For most purposes to which the present invention is directed the telescope 54 may be considered to be fixed thereto. When generating a cone as hereinafter explained it will be pivoted at 55.

It will thus be seen that the telescope 54 is rotatable about an axis normal to the optical axis 25 which axis of rotation is centric of the post 19. It is also rotatable about a horizontal axis 24 which axis is normal to the axis of the post 19. In addition the entire instrument upwardly from and including the standards 13 and 14 is rotatable about a vertical axis.

In this species, two circles, 56 and 57, are provided on the horizontal axis 24 and the graduations or indicia thereon may be read through lenses 34 and 58. One circle, for example, 56 may have the graduations of the circle, whereas the other, 57, may have lines and colines to facilitate figuring the displacement of the optical axis 25 from the axis 24.

EXAMPLE OF OPERATION

One example of use of the instant invention which simplifies a surveying operation is that of locating location stakes at the intersection of a desired plane with the ground surface for a cut as on a roadway. With a conventional transit these stakes are located at each station on the route survey by well known methods of cross sectioning involving trial and error techniques.

With my improved theodolite, it is only necessary to locate the optical axis of the telescope at a point so that it will project in the plane of the cut or fill with its perpendicular axis of rotation normal to the plane. The intersection of the desired plane with the actual surface of the ground may then be staked with plural stakes set at any desired spacing as rapidly as the stakes can be driven within the optical capabilities of the telescope. It is unnecessary to move the theodolite from one location or station to another until its optical capabilities have been reached. In this way, the plane of the cut will be absolutely identified with the surface and its progress may be momentarily checked during the removal of earth to form a perfect slope as opposed to the conventional method wherein trial and error produces minor variations in the slope which are inherent and unavoidable.

The present theodolite simplifies the establishing of an inclined grade, for example, a railway grade from an open pit mining operation. The conventional transit has to be set up over the vertical center line of each trackway and each of the grades established independently in the well known manner.

With the present invention, my theodolite may be stationed at one side of the multi-track roadbed with the axis of its spindle 18 or 19 disposed perpendicular to the plane of the desired roadbed and grade and with the optical axis 25 of the optical member 20 on the plane thereof. Rotation about the axis of spindle 18 will then permit rapid location of stakes to identify the grade and successive visual checking during formation of the grade will maintain the surface of the roadbed level and at the proper grade even though the roadbed may be wide enough for plural trackways.

In addition to the foregoing, if it is desired to slope the roadbed for water drainage to the side, the slope may be precalculated and set in the disposition of the axis of the spindle 18 so that it not only forms a grade but slopes laterally of the grade simultaneously.

The species of the invention shown in FIGURES 4–6 enables one to set the telescope 54 so that upon rotation about a selected axis, it will generate a cone, the axis of which cone may be disposed at any desired angle.

In a conventional transit, if the telescope is disposed at a 45° angle from horizontal and then the telescope is rotated about its vertical axis it will generate a 45° cone having a vertical axis. But, in some instances, for example in establishing pillars to be left during mining operations on an inclined vein, it is desired that the axis of the cone be disposed at an angle substantially perpendicular to the vein incline. The conventional transit is incapable of so doing. However, with the improved species of FIGURES 4–6 one may pivot the theodolite about the axis 24 of the axle 27 to a 45° angle, for example. The optical axis 25 is then disposed X degrees from the axis of post 19 to establish the cone's angularity, and then by rotating the telescope 54 about the axis of post 19, it will generate a cone having its axis disposed at a 45° angle. Obviously, other angles may be selected as required for the particular engineering problem.

There are many other uses to which this device may be conventionally directed but it is felt that the foregoing is sufficient to enable one skilled in the use of the conventional transit to visualize the advantages of the present invention over a conventional transit.

Having thus described my invention I desire to secure by Letters Patent of the United States the following:

1. A theodolite having an optical member rotatable about three axes meeting normally at a point, comprising:
   a stand mounted base rotatable about a vertical axis;
   standards carried by said base;
   a horizontal axle supported by said standards;
   a frame journaled for turning about the axis of said axle, and including
   a support for an optical member carried by said frame and journaled for turning about an axis normal to said axle; and
   an optical member mounted upon said support with its axis normal to said last named turning axis.

2. The invention defined in claim 1 and further characterized by said optical member having a barrel axially offset with respect to its optical axis, said offset part being rotatable about the axis of said barrel section of said axes.

3. A theodolite comprising:
   a stand mounted base rotatable about a vertical axis;
   standards carried by said base;
   a horizontal axle supported by said standards;
   a frame journaled for adjustably turning about the axis of said axle, and including
   a support for an optical member carried by said frame and journaled for turning about an axis normal to said axle;
   an optical member mounted upon said support with its axis normal to said last named turning axis, said optical member having a barrel axially offset with respect to its optical axis, said offset part being rotatable about the optical axis; and
   a segmented vertical circle having one segment secured to said frame and another segment secured to said optical member, said segments being physically independent of each other and movable to a complemental position to form a full circle.

References Cited by the Examiner

UNITED STATES PATENTS

| | | | |
|---|---|---|---|
| 799,878 | 9/1905 | Stockwell | 33—69 |
| 851,706 | 4/1907 | Swasey | 33—71 |
| 1,946,213 | 2/1934 | Jung | 33—50 |
| 2,374,124 | 4/1945 | Peer | 33—69 X |
| 2,583,033 | 1/1952 | Weiss | 33—69 |
| 2,746,155 | 5/1956 | Churgin et al. | 33—69 |

LEONARD FORMAN, *Primary Examiner.*

ISAAC LISANN, *Examiner.*

W. D. MARTIN, *Assistant Examiner.*